Sept. 17, 1957 J. H. ROSENBLATT 2,806,663
CONTRASTRESSED AIRCRAFT STRUCTURES
Filed Jan. 12, 1953 2 Sheets-Sheet 1

INVENTOR
Joel H. Rosenblatt
BY Albert J. Kramer
ATTORNEY

Sept 17, 1957    J. H. ROSENBLATT    2,806,663
CONTRASTRESSED AIRCRAFT STRUCTURES
Filed Jan. 12, 1953    2 Sheets-Sheet 2
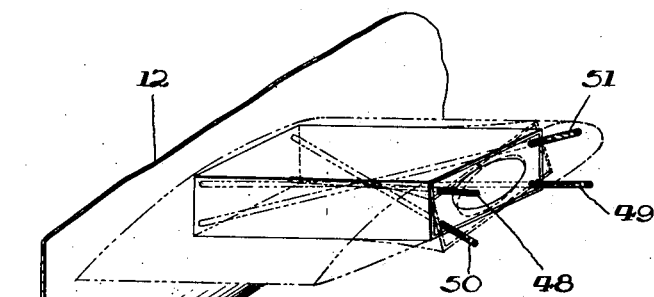
Fig. 8.
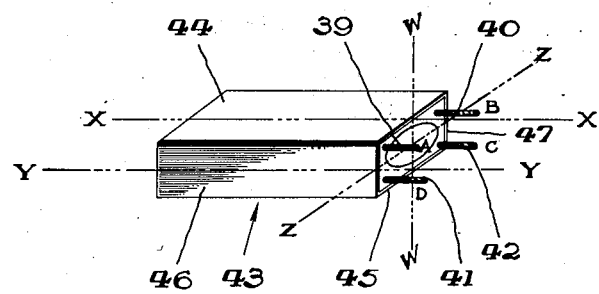
Fig. 6.
Fig. 7.
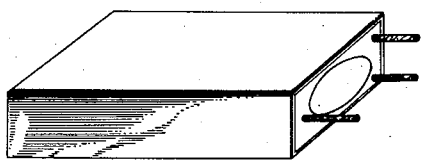
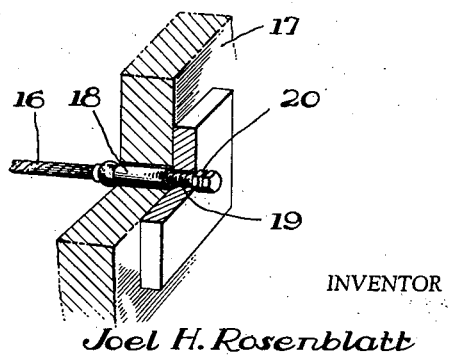
Fig. 3.
INVENTOR
Joel H. Rosenblatt
BY Albert J. Kramer
ATTORNEY

United States Patent Office 2,806,663
Patented Sept. 17, 1957

2,806,663

CONTRASTRESSED AIRCRAFT STRUCTURES

Joel H. Rosenblatt, Baltimore, Md.

Application January 12, 1953, Serial No. 330,617

1 Claim. (Cl. 244—117)

This invention relates to aircraft structures and is more particularly concerned with the contrastressing of structural members thereof to reduce the weight of the structure, or its size, or both, for any given performance requirements.

In the design of aircraft structures, it is essential to reduce, as much as possible, the weight of the structure, within the applicable margins of safety, to provide greater payloads, less materials of construction, and better operating characteristics. The use of light weight members, such as aluminum, for example, has been one means long employed to this end.

One of the difficulties involved in the design of aircraft structures, particularly the wings, for maximum weight saving is the fact that they are subject to stress reversals. When an airplane with cantilever wings, for example, is resting on the ground, the top of the wings are in tension and the bottom in compression under forces induced by the dead load of the wings. When the airplane is in flight, these stresses are reversed due to the lifting forces acting on the wing, placing the top of the wing in compression and the bottom in tension. Such stress reversals make it necessary to use high factors of safety in order to avoid fatigue rupture, particularly where a given structural member is called upon to resist the full force of the reversal loads to be imparted to it.

From the standpoint of safety, it would be better if the structure were designed so that each member thereof, or as many members as possible, was required to carry exclusively either tensional loads or compressional loads of fixed or varying magnitude under the conditions to which the structure is to be subjected.

In accordance with one embodiment of the present invention, structural members which are ordinarily subjected to a reversal of stresses, are contrastressed by the use of filamental members, such as steel wires or cables. The magnitude of the contrastressing is such that a reversal of the load forces will not cause the net stress in the member to become reversed, that is, from compression to tension or vice versa, or will result in it being reversed only to a relatively small degree.

This construction permits the use of lighter and smaller structural members, thereby saving in the cost of materials of construction. It also permits greater payloads equivalent in weight to the net weight of structural material saved.

Such contrastressing can also be used to reduce shear stresses within or between component structural members, or to change vibrational characteristics, or to do both.

In accordance with another embodiment of this invention, the filamental members are provided with variable tensioning means and placed at selected points along the structure so as to induce neutralizing stresses in the structure, as needed, under any given conditions. For example, a member, in normal operations may have adequate stress-resistant characteristics, but would not be safe under certain abnormal or unusual conditions. An instance of such unusual conditions would be in rapid take-offs from short landing fields or aircraft carriers with the aid of auxiliary high thrust units, like jets, which create a peak shock load for the duration of the take-off, but which would generally not be present after the aircraft becomes airborne. Devices to reduce landing distances may impart similar shock loads. Other instances are the recoiling of large calibre firing weapons attached to military aircraft, abrupt combat maneuvers, etc.

In such cases, the filamental member can be tensioned by the variable means provided to induce stresses in the member opposite to that which it will be required to carry under the unusual conditions. For example, if a member at the top of a wing structure is to carry an unusual tensional stress, cables placed along the top of the wing would be tensioned to place the member in compression, thereby tending to neutralize the exterior load. On the other hand, if the member is about to be placed under compressional stress by an exterior force, wires along the bottom of the wing would be tensioned to place the member under initial tension and thereby neutralize or nearly neutralize the external force.

Although such variable tensioning means may be provided in a number of different ways, like cams, etc., it is preferred to employ hydraulic cylinders or jacks, with suitable control valves and valve operating mechanisms, either manually, electrically or otherwise.

The term "hydraulic" as used herein is intended to include any equivalent pneumatic system.

Although it is believed that the invention will be understood from the above explanation, in order to illustrate it and the manner in which it may be used, there is shown in the accompanying drawings representative embodiments.

In the drawing:

Fig. 3 is a perspective view showing details of a form of cable anchorage.

Figs. 6, 7 and 8 are diagrammatic views, illustrating how the cables can be arranged for different contrastressing effects.

Figure 1:
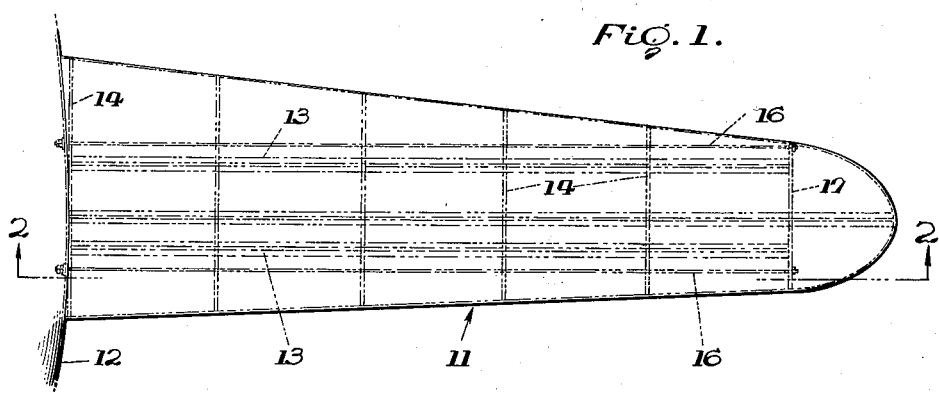
Fig. 1 is a top plan view of an airplane cantilever wing in accordance with one form of the invention.
Figure 2:
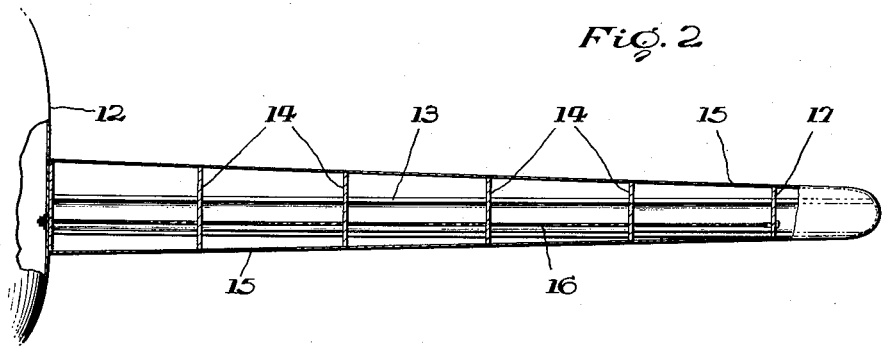
Fig. 2 is a front elevational section along the line 2—2 of Fig. 1.

Referring with more particularity to the drawing in which like numerals designate like parts, the embodiment illustrated in Figs. 1, 2 and 3 comprises an ordinary cantilever wing 11 attached to a fuselage 12 and having spars 13 and ribs 14 secured together to form a rigid frame over which the covering or skin 15 is supported and to which it is secured in the usual manner. Contrastressing cables 16 extend from an outermost rib 17 parallel to the spars 13 and their ends are anchored to the rib 17 and fuselage, respectively. In this embodiment the vertical position of the cables 16 is illustrated below the neutral axes of the spars to neutralize compressional forces in the spars above the axes when the aircraft is in flight. Any suitable means may be used to anchor the ends of the cable, one suggested means being illustrated in Fig. 3 and comprising a sleeve 18 in which the corresponding end of the cable is slidably disposed. The sleeve has internal threads which engage a bolt 19 and the cable is secured to the end of the bolt. By turning the bolt to advance it outwardly from the sleeve, tension in the cable is increased and when the desired tension has been imparted to it, the bolt is held in fixed position by lock nuts 20. Other anchorage means may be employed, including direct welding, end socket connectors, shear pins or keys, etc.

One or more cables may be used to develop any amount of contrastressing required for a calculated design of the structural members. The embodiment illustrated in Figs. 1, 2 and 3 permits contrastressing to an extent where the bottom of the wing will substantially always be in compression and the top always in tension, irrespective of the reversal of forces to which the structure is designed to be subjected. This, of course, may be varied to permit some modest reverse stresses, but should be of relatively small magnitude so as not to appreciably affect the useful life of the member.

By anchoring the inner ends of the cables to the fuselage, an important advantage is obtained. The wings, being of cantilever construction, have their greatest or critical bending moments at the point of connection to the fuselage. Accordingly, the contrastressing cables are effective not only throughout the length of the wing, but also at the point of critical bending moment.

Figures 4, 5:
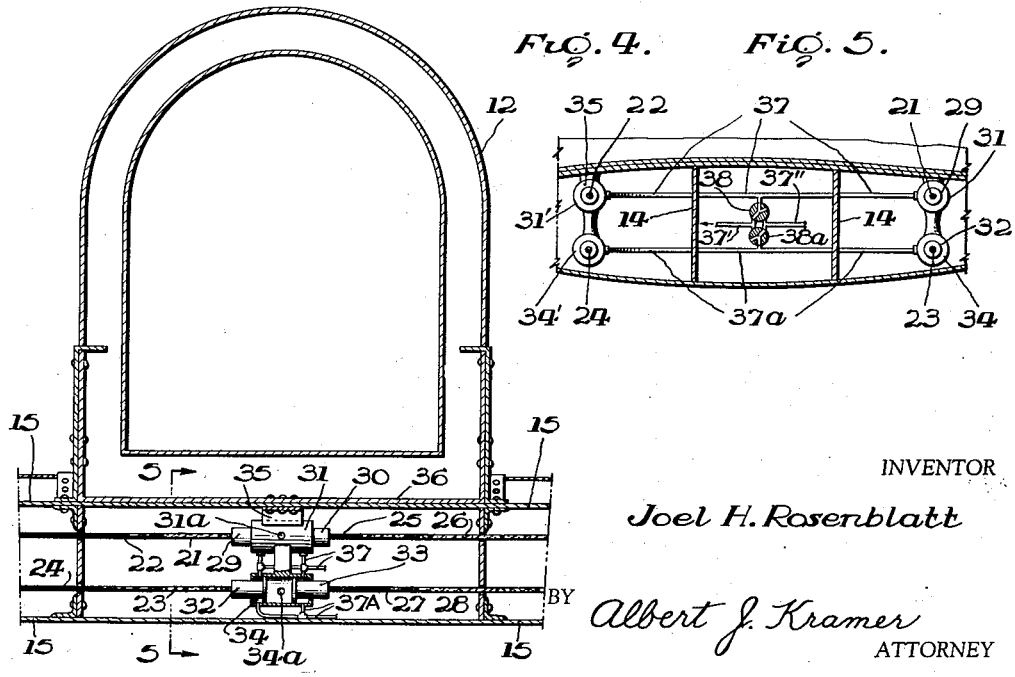
Fig. 4 is a cross sectional view, partly broken away, through the fuselage and wings of an airplane of the stressed-skin type, showing a modified form of the invention.
Fig. 5 is a section along the line 5—5 of Fig. 4.

In the embodiment illustrated in Figs. 4 and 5, the inner ends of the cables are connected to hydraulic pistons located in the fuselage. The embodiment shows the arrangement in connection with two sets of cables, one set for each wing. Cables 21 and 22 are located along the top of one wing and cables 23 and 24 along the bottom thereof. Similar cables 25 and 26, and 27 and 28 are along the top and bottom of the other wing, respectively, substantially as shown. Each cable is connected to the piston of one of a group of hydraulic cylinders or jacks. Each cylinder has two opposing pistons, such as pistons 29 and 30 of upper cylinder 31 connected to one pair of corresponding cables of the two wings, and pistons 32 and 33 of cylinder 34 connected to the other pair of corresponding cables.

The cylinders are secured to the fuselage in any suitable manner, such as by brackets 35 on structural member 36. Pipe lines 37 extend from the outer ends of the upper cylinders 31 and 31' to one point of a three-way control valve. Another point of the valve is connected to a high pressure line 37' from a source of hydraulic pressure (not shown) and the third point to a bleeder line 37'' from the low pressure side of the hydraulic system. The space in the cylinders between the pistons communicate with the exterior through vents 31(a) and 34(a) in the cylinders so as to prevent any build up of pressure, positive or negative, therein. The control valves may be stationed at a point convenient to the pilot, flight engineer, or other crew member for use as needed, or they may be of the well known solenoid type (rotary or reciprocating) with suitable electrical control means therefore located at the convenient station. Similar pipe lines 37(a) extend from the lower cylinders 34 and 34' and are similarly connected to the high pressure and low pressure lines 37' and 37'' through the three-way valve 38(a). The valves are preferably made co-acting, such as through suitable gearing, so that one of the line 37 and 37(a) will always be connected to the low pressure side when the other is connected to the high pressure side.

The contrastressing cables employed in this invention are wholly distinct from ordinary guying or reinforcing members whose purpose is to resist operational stresses as they develop and which the main structural members they support are unable to carry. These contrastressing members are designed to deliberately create new stresses in the structure which otherwise would not be there, and to apply these stresses to the structure in a predetermined manner, at predetermined points and of predetermined magnitude and direction. In accordance with this invention such stresses can be made to oppose torsional, flexural, and vibrational stresses.

With this embodiment, the contrastressing is placed under the absolute control of the operator or operators of the aircraft for use as needed under temporary conditions of unusual application of forces and the contrastressing is applied in opposition to the load forces in order to neutralize them. This is more clearly illustrated in Fig. 6, wherein four contrastressing cables 39, 40, 41 and 42 are used and arranged in a rectangular pattern in a structural member 43, having top 44, bottom 45, and sides 46 and 47. For a load tending to place the top 44 in tension and the bottom 45 in compression, the contrastressing would be applied by tensioning the cables 39 and 40. For a load tending to place the side 46 in tension and the side 47 in compression, the contrastressing would be applied by tensioning the cables 39 and 41.

The triangular pattern is shown in Fig. 7 for a similar structural member where the load characteristics are such as to require more contrastressing on one side than on the other.

In Fig. 8 there is diagrammatically illustrated how contrastressing cables can be applied to neutralize torsional stresses. In addition to the two longitudinal cables 48 and 49 at opposite corners, diagonal cables 50 and 51 at the other opposite corners are provided, substantially as shown. The diagonal cables develop a direct oppositional force to the shear stresses. The longitudinal cables introduce stresses which combine with the shear stresses to develop a resultant or principal stress at an angle to the applied torsional force.

The feed lines may extend from any existing hydraulic system in the aircraft, or an independent pump and reservoir may be provided, or the entire hydraulic system may be redesigned to accommodate the entire hydraulic force requirements of the aircraft with a single unit in order to eliminate unnecessary duplication of apparatus in the aircraft.

In a highly indeterminate structure, an entire element of the aircraft, such as a completed wing assembly, may be economically contrastressed by considering the entire assembly as a unit, including its spars, girders, skin, struts, etc., and by providing within the unit such load distributing facilities, such as plates in a plane perpendicular to that of the contrastressing cables, as might serve as a fixed anchorage for the stressed filaments and providing the means of distributing the contrastressing loads completely across the entire element being considered as the unit for contrastressed design.

Having thus described my invention, I claim:

In an aircraft structure having a structural member subject to stress reversals, at least one cable connected to said structure to contrastress said member, said cable having a high tensile strength in comparison to the strength of said member, hydraulic cylinders for applying tension to the cable so as to impose stresses in said member in opposition to stresses to which the member may be subjected under a given load condition, and means for controlling the actuation of said cylinders.

References Cited in the file of this patent

UNITED STATES PATENTS

| | | |
|---|---|---|
| 1,244,470 | Christensen | Oct. 30, 1917 |
| 1,246,028 | Kleckler | Nov. 6, 1917 |
| 1,390,563 | Knoell | Sept. 13, 1921 |
| 1,400,620 | Maxwell et al. | Dec. 20, 1921 |
| 1,444,058 | Boyd | Feb. 6, 1923 |
| 1,500,235 | Clark | July 8, 1924 |
| 1,686,910 | Frease | Oct. 9, 1928 |
| 2,109,529 | Goddard | Mar. 1, 1938 |
| 2,410,609 | Pecker | Nov. 5, 1946 |

FOREIGN PATENTS

| | | |
|---|---|---|
| 119,726 | Great Britain | Oct. 17, 1918 |
| 130,825 | Great Britain | Aug. 14, 1919 |
| 947,381 | France | Jan. 10, 1949 |